United States Patent
Füsser

(10) Patent No.: US 7,481,464 B2
(45) Date of Patent: Jan. 27, 2009

(54) COUPLING, PARTICULARLY PIPE COUPLING FOR HIGH-PRESSURE PIPES OR HOSES

(75) Inventor: Bernd Füsser, Essen (DE)

(73) Assignee: Karl Hamacher GmbH, Bochum (DE)

( * ) Notice: Subject to any disclaimer, the term of this patent is extended or adjusted under 35 U.S.C. 154(b) by 174 days.

(21) Appl. No.: 11/607,544

(22) Filed: Dec. 1, 2006

(65) Prior Publication Data

US 2007/0284879 A1  Dec. 13, 2007

(30) Foreign Application Priority Data

Jun. 8, 2006  (DE) .................. 10 2006 027 015
Jul. 28, 2006  (EP) .................. 06015775

(51) Int. Cl.
*F16L 37/00*  (2006.01)

(52) U.S. Cl. .................. 285/305; 285/370; 285/321; 248/55

(58) Field of Classification Search ........... 285/305, 285/370, 321; 248/60, 55
See application file for complete search history.

(56) References Cited

U.S. PATENT DOCUMENTS

| | | | | |
|---|---|---|---|---|
| 1,073,850 A | * | 9/1913 | Greer | 285/109 |
| 1,916,989 A | * | 7/1933 | Rader | 428/609 |
| 2,877,732 A | * | 3/1959 | Eaton | 114/22 |
| 3,100,121 A | * | 8/1963 | Hillmer | 285/321 |
| 3,127,199 A | * | 3/1964 | Roe | 285/145.4 |
| 3,334,929 A | * | 8/1967 | Wiltse | 285/305 |
| 3,422,630 A | * | 1/1969 | Marier | 405/252 |
| 4,186,946 A | * | 2/1980 | Snow | 285/94 |
| 4,428,603 A | * | 1/1984 | Davlin | 285/368 |
| 4,498,874 A | * | 2/1985 | Pichl | 440/83 |
| 6,179,347 B1 | * | 1/2001 | Dole et al. | 285/321 |
| 6,273,634 B1 | * | 8/2001 | Lohbeck | 403/297 |
| 6,293,098 B1 | * | 9/2001 | Coates | 60/322 |
| 6,364,256 B1 | * | 4/2002 | Neider et al. | 248/55 |
| 6,663,070 B2 | * | 12/2003 | Valentz et al. | 248/354.1 |

FOREIGN PATENT DOCUMENTS

DE  73 41 019 U1  5/1975
DE  100 07 369 A1  8/2001

* cited by examiner

*Primary Examiner*—David E Bochna
(74) *Attorney, Agent, or Firm*—Collard & Roe, P.C.

(57) ABSTRACT

A coupling, particularly a pipe coupling for high-pressure pipes or high-pressure hoses, is equipped with coupling pieces provided at the ends to be connected, in each instance, and with a cuff that couples the coupling pieces, using at least two shear elements. The coupling pieces engage over the cuff that lies on the inside, as an extension of the ends, with almost the same diameter.

12 Claims, 4 Drawing Sheets

COUPLING, PARTICULARLY PIPE COUPLING FOR HIGH-PRESSURE PIPES OR HOSES

CROSS REFERENCE TO RELATED APPLICATIONS

Applicant claims priority under 35 U.S.C. §119 of German Application No. 10 2006 027 015.0 filed Jun. 8, 2006 and European Application No. 06 015 775.7 filed Jul. 28, 2006.

BACKGROUND OF THE INVENTION

1. Field of the Invention

The present invention relates to a coupling. More particularly, the invention relates to a pipe coupling for high-pressure pipes or hoses. The coupling has coupling pieces provided at the ends to be connected, in each instance, and has a cuff that couples the coupling pieces, using at least two shear elements.

2. The Prior Art

A coupling of the embodiment described initially has become known from the utility model DE 73 41 019 U1. This coupling is a connecting element for a pipe connection secured against shear. High-pressure pipes or high-pressure hoses, in other words pipes or hoses for the application of pressures above 50 bar, usually taking into consideration pressures up to several 100 bar, are not described.

Such high-pressure pipes and high-pressure hoses are used in many different ways, particularly underground, in order to provide tunneling machines provided there with the required hydraulic pressure. This use raises the problem that such pipes or hoses must follow the advancing shield structures. This requirement presupposes guidance and transport of the high-pressure pipes or high-pressure hoses, in order to avoid damage and to guarantee problem-free operation of the tunneling machines throughout.

In the past, problems have often resulted because the related pipe coupling projects beyond the outside diameter of the pipelines or hoses, and consequently can be damaged during transport, and/or no problem-free transport is possible. Examples of such pipe couplings, which have otherwise proven themselves, are the object of DE 100 07 369 A1. At this point, the invention sets in.

SUMMARY OF THE INVENTION

It is an object of the invention to further develop a coupling, particularly a pipe coupling for high-pressure pipes or hoses, of the embodiment described initially, so that transport of the related pipeline or hose line, including coupling, succeeds in simpler manner than before and, in particular, without damage for the coupling.

These and other objects are accomplished, according to one aspect of the invention, by providing in a coupling of the type stated, particularly a pipe coupling for high-pressure pipes or hoses, that the coupling pieces engage over the cuff, which lies on the inside, as an extension of the ends that has almost the same diameter.

According to the invention, the cuff is not disposed in such a manner—as in DE 100 07 369 A1—that it engages over the two coupling pieces, but rather it is situated in the coupling and consequently in the interior of a related pipeline or hose line. In contrast, the coupling pieces engage over the cuff that lies on the inside, specifically as an extension of the ends that has almost the same diameter. In other words they lie outside of the coupling. This arrangement means that the ends of the high-pressure pipes or high-pressure hoses make a transition into the coupling pieces, which engage over the cuff that lies in the interior of the coupling, at almost the same diameter.

The coupling pieces are disposed at a (slight) axial distance from one another and lie opposite one another in the region of a connection plane and/or abutment plane. As a result, the high-pressure pipes or high-pressure hoses, or pipes or hoses in general, make a transition into one another at practically the same diameter, even in the region of the coupling. Consequently, a pipeline or hose line having an almost continuously uniform outside diameter is available, even in the region of the coupling. This arrangement makes damage-free and simple transport of the pipeline or hose line possible, particularly in its axial direction.

Furthermore, the circumstance that the coupling pieces and the cuff are configured with mirror symmetry in relation to the abutment plane and/or the connection plane is of particular significance. It is known that the abutment plane defines the plane in which the coupling pieces abut one another with a (slight) axial distance. Because of the symmetrical configuration, connecting the ends of individual pipes and hoses is particularly simple. Connecting is simple because a need no longer exists to differentiate between a female or male end—as is frequently the case in the state of the art—and instead, the ends can be coupled directly. For this purpose, the cuff merely has to be introduced between the coupling pieces and undergo fixation relative to the coupling pieces, using the at least two shear elements.

In order to guide and hold the cuff in the interior of the coupling pieces without problems, the coupling pieces, taken together, have an accommodation for the cuff that is guided in them axially and radially. As soon as the cuff has been introduced between the coupling pieces and the coupling pieces have been displaced relative to one another, the cuff, in the accommodation, both functions as a stop and secures the position of the coupling pieces relative to one another at the desired axial distance, in the region of the abutment plane. In this way, it is guaranteed, at the same time, that related half-ring grooves in the cuff, on the one hand, and the related coupling piece, in each instance, on the other hand, taken together, form a ring groove for accommodating the related shear element.

In fact, in most cases, the cuff is cylindrical, with the aforementioned half-ring grooves, in each instance. The coupling pieces also have half-ring grooves that correspond to the half-ring grooves of the cuff. The half-ring grooves of the cuff and those of the coupling pieces, taken together, form a ring groove for accommodating the shear element, in each instance, as soon as the cuff is placed in the accommodation formed by the coupling pieces, taken together, and the coupling pieces assume their installation position predetermined in this manner. In order to be able to introduce the shear element, in each instance, the coupling pieces have introduction openings, in each instance, which openings are connected with their half-ring grooves.

The shear elements are regularly cylinder bodies threaded onto a core, with an end-side loop. These cylinder bodies can be made of steel. The core is regularly a steel cable. In this manner, the shear element is adapted to the stresses that occur, particularly tensile stresses. That also holds true for the coupling pieces and the cuff, which are also made of steel. In this connection, it has proven itself to configure the coupling pieces as separate components, which are connected with the ends of the pipe or hoses (also made of steel), for example welded to them.

Seals provided on the outside edge, in each instance, finally ensure that the cuff is sealed relative to the coupling pieces. In this manner, a tight connection between the cuff that lies on the inside and the coupling pieces that lie on the outside, in each instance, is produced. This connection exists even if the coupling pieces were to move slightly in the axial direction, as a result of the pressure that exists in the interior.

An object of the invention is also a pipe holder that is particularly suitable for accommodating the high-pressure pipes or high-pressure hoses in question, including the coupling according to the invention as described. The pipe holder in question is characterized by one or more guide rollers that form a V-shaped or U-shaped accommodation. In detail, the guide rollers themselves can, of course, be configured to be V-shaped or U-shaped. Alternatively or additionally, it is also possible that at least two guide rollers (or even more guide rollers) are set against one another in V shape or W shape. In this manner, a particularly advantageous pipe holder is made available, which is predestined for guidance and transport of a pipeline or hose line equipped with the coupling according to the invention. Significant advantages result.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
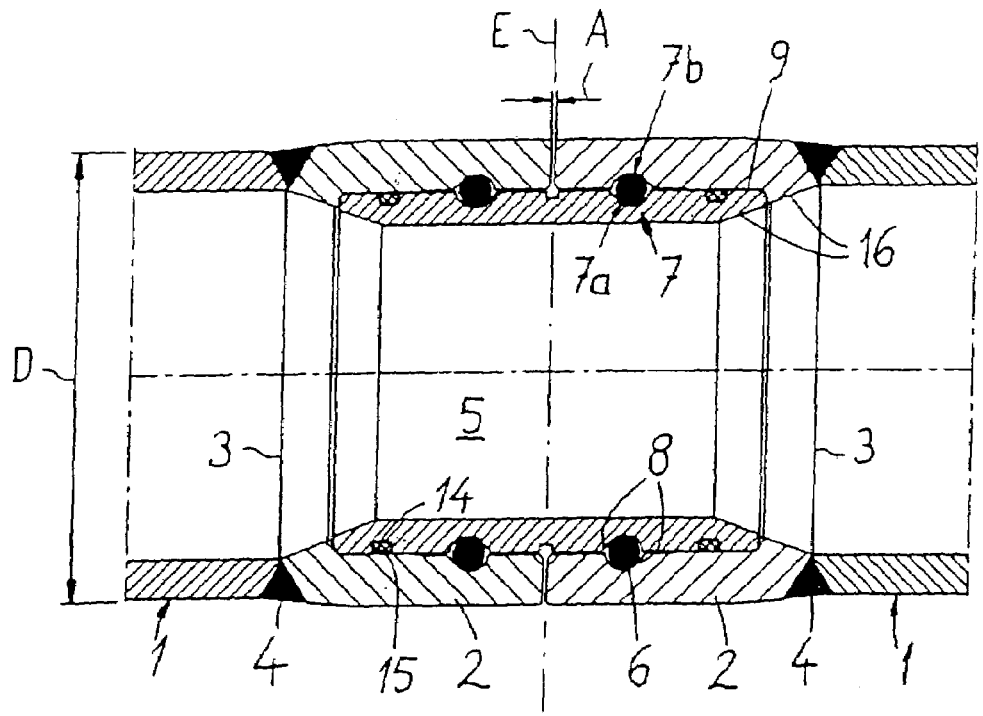
FIG. 1 is an axial section view of the coupling according to an embodiment of the invention.
Figure 2:
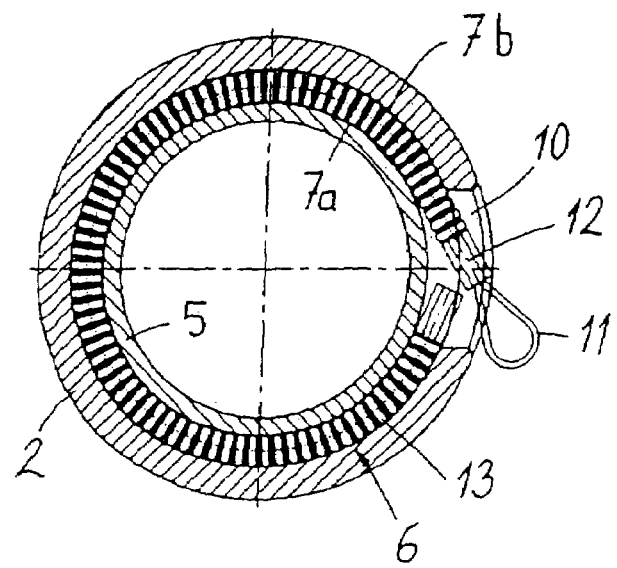
FIG. 2 is a cross-sectional view of the embodiment of FIG. 1.

Turning now in detail to the drawings, FIG. 1 shows a coupling which, in the case of the exemplary embodiment, and without restrictions, is a pipe coupling for connecting high-pressure pipes 1. Of course, the coupling or pipe coupling could also be used for coupling hoses, not shown, or high-pressure hoses. In this connection, the hoses or the high-pressure pipes 1 and also the coupling are designed in such a manner that media can be transported in the interior, which possess a pressure far above 50 bar, particularly even several 100 bar pressure. The media in question are hydraulic media, which are used to supply tunneling machines in underground mining operations, as an example and without restrictions.

The coupling in question, which is configured with rotation symmetry and in cylindrical manner, without restrictions, is composed, in its fundamental structure, of two coupling pieces 2, which are provided on ends 3 of the high-pressure pipes 1 to be connected, in each instance, in the exemplary case. In fact, the two coupling pieces 2 are made from steel (like high-pressure pipes 1). Pieces 2 are set onto high-pressure pipes 1 at their ends, in each instance; in the exemplary embodiment they are connected with high-pressure pipes 1. For this purpose, a circumferential weld connection 4 is provided, in each instance, which couples high-pressure pipe 1 at its end 3, in each instance, with the related coupling piece 2, configured as a separate component.

Within the framework of the invention, the two coupling pieces 2 can also be made from plastic. The high-pressure pipes 1 may also be made of plastic. In that case, the weld connection 4 is configured as a plastic bond connection.

Furthermore, one can see the cuff 5, which couples the two coupling pieces 2 and consequently high-pressure pipes 1 with one another using two shear elements 6. Cuff 5 can be made from steel or, again, from plastic. The same holds true for shear elements 6. In this connection, of course, even more than two shear elements 6 can be implemented. Shear elements 6 essentially serve to absorb movements of high-pressure pipes 1, predominantly in the axial direction, that are connected with pressure impact on high-pressure pipes 1 and consequently on the coupling, in that shear elements 6 are increasingly wedged into related ring grooves 7.

In fact, ring grooves 7 are composed of two half-ring grooves 7a, 7b, in each instance. In this connection, the cylindrically configured cuff 5 has half-ring grooves 7a for accommodating the shear elements, while coupling pieces 2 possess half-ring grooves 7b that correspond to the aforementioned half-ring grooves 7a of cuff 5. As soon as cuff 5 assumes its installation position shown in FIG. 1, half-ring grooves 7a, 7b, taken together, form ring grooves 7, in each instance, into which shear elements 6 can then be introduced in order to wedge cuff 5 together with coupling pieces 2 and consequently high-pressure pipes 1.

It can be seen that ring grooves 7, i.e. half-ring grooves 7a, 7b, are equipped with slanted surfaces 8 that lie opposite one another, which support wedging of shear elements 6 into ring grooves 7, as soon as the pipes or high-pressure pipes 1 are pulled apart axially (due to the pressure that is exerted in the interior). The greater this pressure impact is, the greater is the wedging effect of slanted surfaces 8 in connection with shear elements 6.

The circumstance that coupling pieces 2 extend ends 3 of the pipes or high-pressure pipes 1 essentially with the same diameter is of particular significance for the invention. This feature means that the outside diameter D predetermined by the pipes or high-pressure pipes 1 is essentially maintained by the coupling, as well. In this way, a pipeline composed of several high-pressure pipes 1, for example, using the coupling according to the invention, can be pulled in the longitudinal direction without any steps, or moved by way of a guidance device, for example a pipe holder shown in FIG. 3a ff.

It can be seen that coupling pieces 2 engage over cuff 5 that lies on the inside as an extension of ends 3 of the pipes or high-pressure pipes 1, with almost the same diameter. In this connection, coupling pieces 2 and cuff 5, in each instance, are configured symmetrically, in each instance, relative to a connecting plane or abutment plane E. Abutment plane E characterizes a plane relative to which coupling pieces 2 are disposed lying opposite one another, at an axial distance A. By means of this symmetrical configuration of coupling pieces 2, on the one hand, and cuff 5, on the other hand, the result is achieved that any desired ends 3 of the pipes or high-pressure pipes 1 can be coupled with one another in the manner described, without having to use male or female ends. In fact, cuff 5 assures that coupling pieces 2 maintain the described axial distance A from one another, as described, while lying opposite one another, and for the remainder, half-ring grooves 7a, 7b, taken together, form ring grooves 7 for accommodating shear elements 6, in each instance.

For this purpose, coupling pieces 2, taken together, form an accommodation 9 for cuff 5 that is axially and radially guided in them. This accommodation 9 is configured to be U-shaped in cross-section, within the framework of the exemplary embodiment and without restrictions, and adapted to cylindrical cuff 5. As soon as cuff 5 has been laid into the accommodation 9 in question, coupling pieces 2 can be displaced axially against one another to such an extent until they have the desired axial distance A. At the same time, half-ring grooves 7a, 7b, taken together, form the desired ring grooves 7, in this position, into which shear elements 6, in each instance, can be pushed.

In order to facilitate introduction of shear elements 6, coupling pieces 2 have radial introduction openings 10, which are connected with the related half-ring groove 7b of coupling piece 2, in each instance. In order for introduction and, if necessary, pulling out of shear elements 6 to succeed, these possess an end-side loop 11 on a core 12 located there. In fact, individual cylindrical bodies 13 are threaded onto the core 12 in question, of shear element 6, in each instance. Core 12 of the shear element 6 is made from steel cables. Cylinder bodies 13 are little rollers made of steel. Cuff 5 and coupling pieces 2 are also made from steel.

On the edge of cuff 5—facing ends 3, in each instance—there are circumferential ring grooves 14 let into cuff 5, which accommodate seals 15. In this manner, the interior of the coupling and that of pipes 1 is reliably sealed off relative to ring grooves 7 and openings 10 provided at this location, specifically even if coupling pieces 2 move (slightly) relative to one another, for example, in the axial direction, changing their axial distance A. Finally, the exemplary embodiment shows that both coupling pieces 2 and cuff 5 are equipped with slanted surfaces 16 on their face edge side, which ensure a transition from pipe 1, in each instance, to the coupling, that is advantageous for flow. This transition is advantageous because the related slanted surfaces 16 have approximately the same incline and make a transition into one another with almost no transition.

Figure 3B:
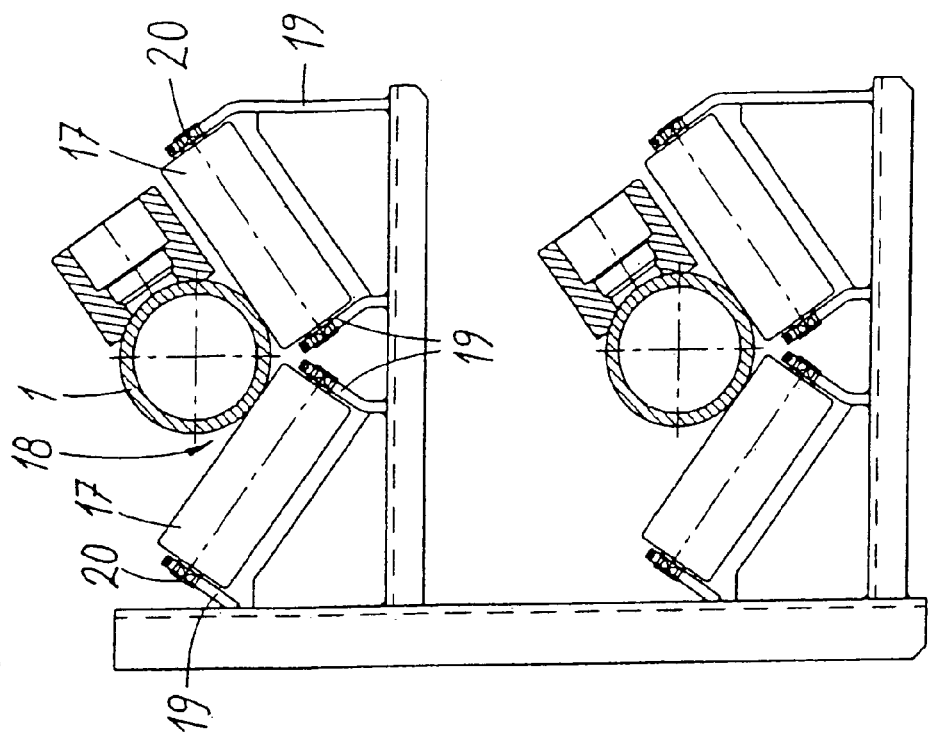
FIGS. 3a to 3e show various configurations of the pipe holder according to the invention.
Figure 3A:
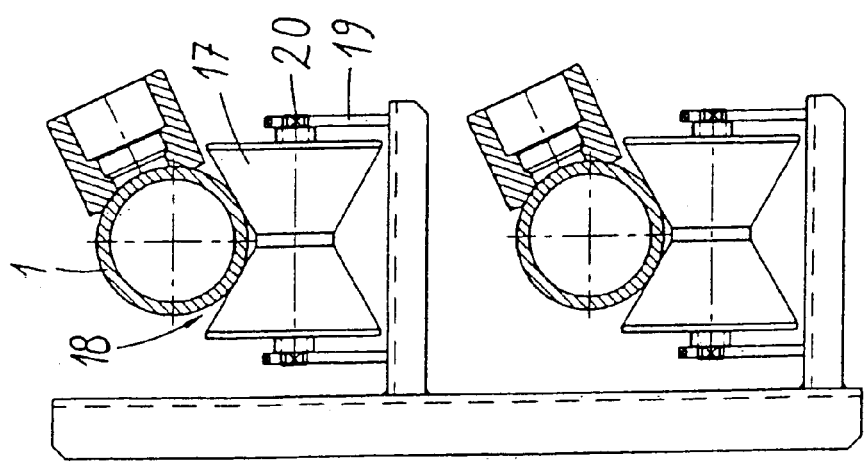
Figure 3C:
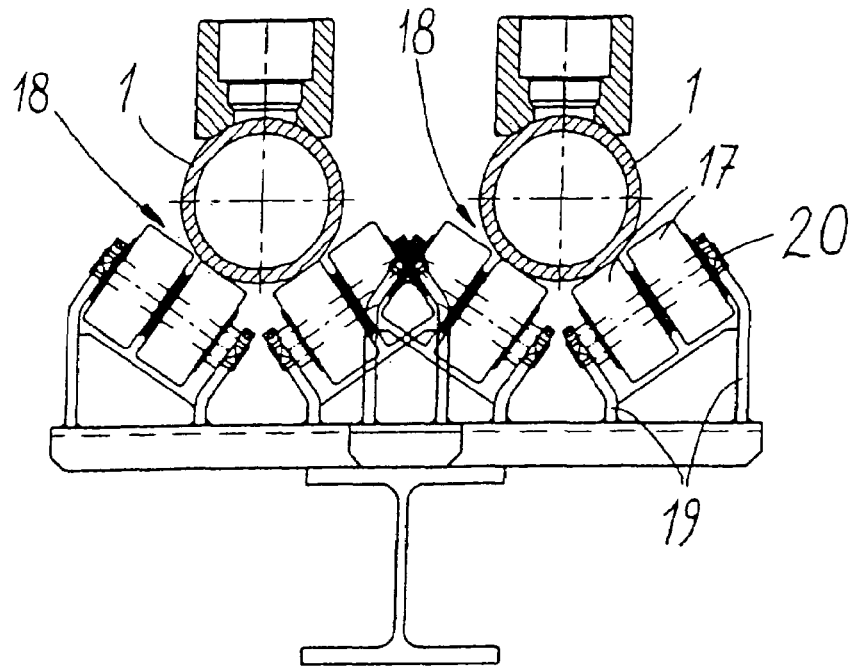
Figure 3D:
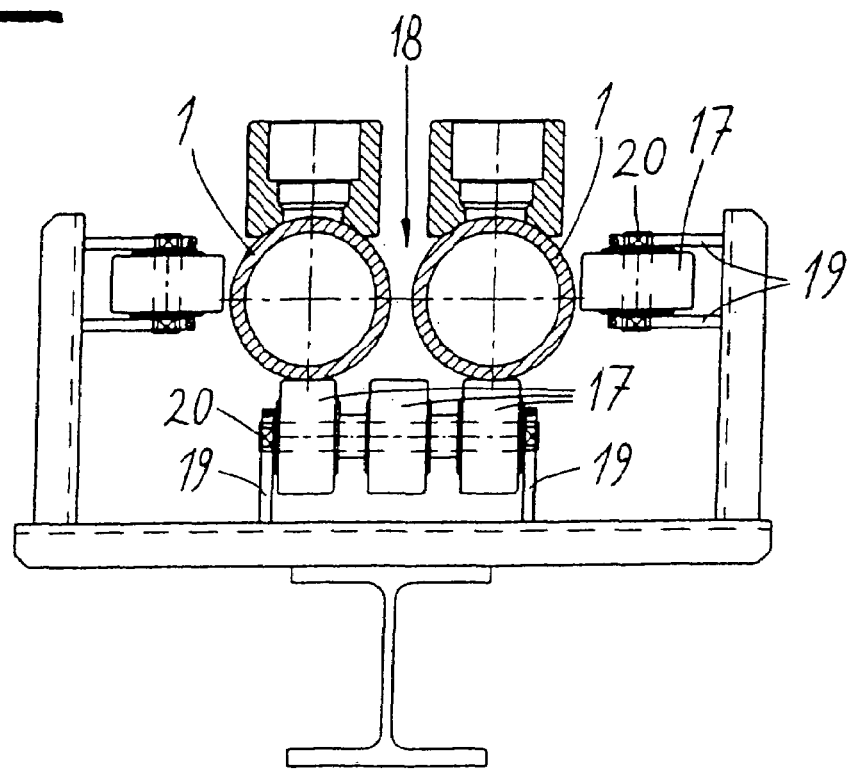
Figure 3E:
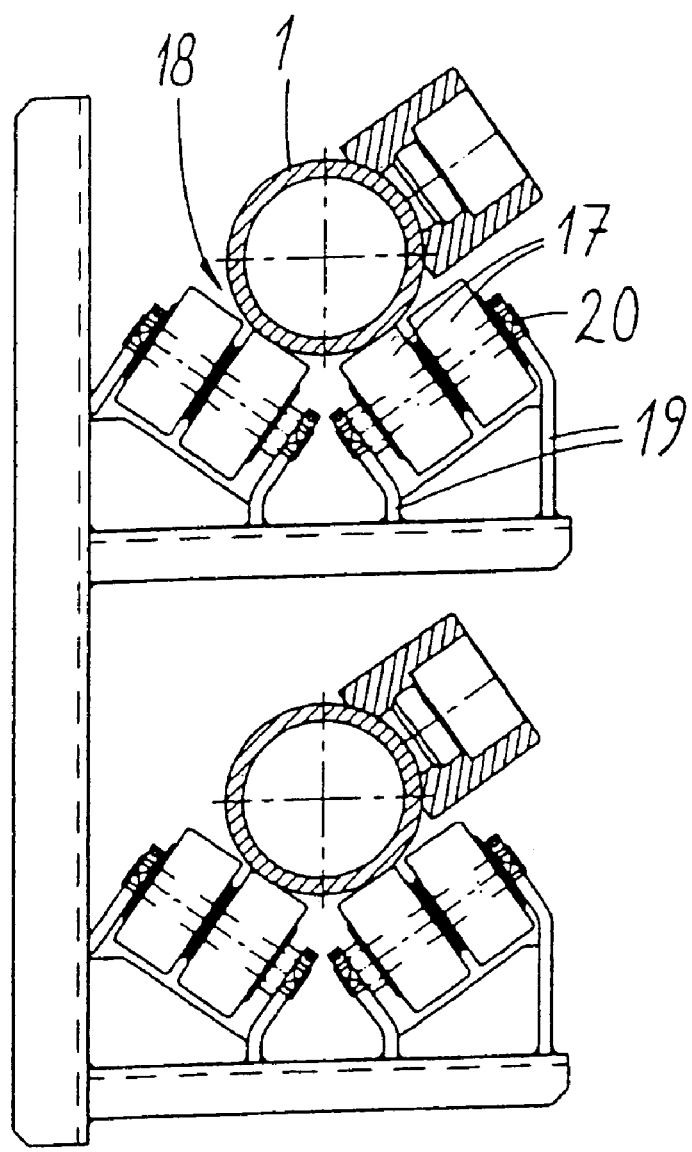

Finally, FIG. 3a ff. show different embodiments for a pipe holder or a comparable guidance device, which allows guided axial transport of a pipeline composed of several pipes 1, using the coupling. In fact, the pipe holder in question is characterized by one or more guide rollers 17. Guide rollers 17 form a U-shaped or V-shaped accommodation 18 for the pipeline in question, or also for a hose line, in each instance. Within the framework of FIG. 3a, guide roller 17 itself is configured to be V-shaped. In contrast, in the other exemplary embodiments, at least two guide rollers 17 are used, in each instance, which are set against one another in V shape or U shape. For this purpose, the pipe holder has several struts 19 that accommodate the individual guide rollers 17 so as to rotate. In fact, guide rollers 17 are suspended in related accommodations 20 of struts 19, so as to rotate.

Although only a few embodiments of the present invention have been shown and described, it is to be understood that many changes and modifications may be made thereunto without departing from the spirit and scope of the invention as defined in the appended claims.

What is claimed is:

1. A coupling for coupling ends of high-pressure pipes or high-pressure hoses comprising:

(a) a plurality of coupling pieces, each coupling piece provided at a respective end of the pipes or hoses to be connected, each end having an end diameter; and (b) a cuff comprising at least two shear elements for coupling a respective pair of coupling pieces, each of said at least two shear elements comprising a core having an end-side loop and a plurality of cylinder bodies threaded onto the core;

wherein said pair of coupling pieces engage over the cuff as respective extensions of the respective ends, each extension having a diameter nearly identical to the end diameter.

2. The coupling according to claim 1, wherein each pair of coupling pieces and associated cuff are configured symmetrically with regard to a connecting plane (E).

3. The coupling according to claim 2, wherein the coupling pieces are disposed lying opposite one another at an axial distance near the connection plane.

4. The coupling according to claim 1, wherein the coupling pieces or the cuff are produced from plastic or metal.

5. The coupling according to claim 4 wherein the coupling pieces or the cuff are produced from steel.

6. The coupling according to claim 1, wherein the coupling pieces are structured as separate components connected with the ends.

7. The coupling according to claim 6, wherein the coupling pieces are welded to the ends.

8. The coupling according to claim 1, wherein the coupling pieces together form an accommodation for the cuff to be axially and radially guided in the coupling pieces.

9. The coupling according to claim 1, wherein the cuff is cylindrical and comprises half-ring grooves, each half-ring groove accommodating a respective shear element.

10. The coupling according to claim 9, wherein that each coupling piece has a half-ring groove corresponding to a respective half-ring groove of the cuff.

11. The coupling according to claim 10, wherein each coupling piece comprises an introduction opening for a respective shear element connected with the half-ring groove for the shear element.

12. A pipe holder in combination with a pipeline or hose line comprising high-pressure pipes or high pressure hoses having at least one coupling for coupling ends of the pipes or hoses comprising a plurality of coupling pieces, each coupling piece provided at a respective end of the pipes or hoses to be connected, each end having an end diameter, a cuff comprising at least two shear elements for coupling a respective pair of coupling pieces, each of said at least two shear elements comprising a core having an end-side loop and plurality of cylinder bodies threaded onto the core, said pair of coupling pieces engaging over the cuff as respective extensions of the respective ends, each extension having a diameter nearly identical to the end diameter, said pipe holder comprising at least one guide roller or a plurality of guide rollers forming a U-shaped or V-shaped accommodation.

* * * * *